(12) United States Patent
Medina et al.

(10) Patent No.: US 11,828,135 B2
(45) Date of Patent: Nov. 28, 2023

(54) FULL-BORE IRIS ISOLATION VALVE

(71) Applicant: SAUDI ARABIAN OIL COMPANY, Dhahran (SA)

(72) Inventors: Mauricio Guiza Medina, Alkhobar (SA); Fahad M. Yami, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 61 days.

(21) Appl. No.: 17/682,305

(22) Filed: Feb. 28, 2022

(65) Prior Publication Data

US 2023/0272693 A1  Aug. 31, 2023

(51) Int. Cl.
*E21B 34/14* (2006.01)
*E21B 33/12* (2006.01)
*F16K 3/03* (2006.01)

(52) U.S. Cl.
CPC .............. *E21B 34/14* (2013.01); *E21B 33/12* (2013.01); *F16K 3/03* (2013.01)

(58) Field of Classification Search
CPC ............. E21B 34/14; E21B 33/12; F16K 3/03
See application file for complete search history.

(56) References Cited

U.S. PATENT DOCUMENTS 2,572,299 A * 10/1951 Antolch ................ F16K 15/035
   137/527
6,382,315 B1 * 5/2002 Langseth .............. E21B 49/081
   166/265

(Continued)

FOREIGN PATENT DOCUMENTS

GB  2439175 A  12/2007

OTHER PUBLICATIONS

E. E. Ifediora et al., "The Use of Tubing Tester Valve to Optimize Completion Cost and Time", SPE-193507-MS, pp. 1-5 (5 pages).

(Continued)

*Primary Examiner* — Steven A MacDonald
(74) *Attorney, Agent, or Firm* — Osha Bergman Watanabe & Burton LLP

(57) ABSTRACT

A system for a packer in a well includes a completion string, having production tubing, disposed within the well. The packer is connected to the production tubing and the production tubing defines an annulus in the well. A full-bore iris isolation valve is installed on the production tubing and located downhole from the packer. The full-bore iris isolation valve has an open position, a closed position, and a plurality of blades. The closed position isolates the annulus from an inner orifice of the production tubing to set the packer in the well. An activation mechanism, disposed adjacent to and up hole from the full-bore iris isolation valve, is configured to interact with the plurality of blades to place the full-bore iris isolation valve in the open position and the closed position. A sliding sleeve, having an inner profile, is connected to and located up hole from the activation mechanism. A setting tool has an external circumferential surface that mates with the inner profile of the sliding sleeve to apply a push force and a pull force to the sliding sleeve. The push force is applied to the full-bore iris isolation, using the activation mechanism, to place the full-bore iris isolation valve in the closed position and the pull force is applied to the full-bore iris isolation, using the activation mechanism, to place the full-bore iris isolation valve in the open position.

18 Claims, 3 Drawing Sheets

(56) References Cited

U.S. PATENT DOCUMENTS

| | | | |
|---|---|---|---|
| 6,634,429 B2 | 10/2003 | Henderson et al. | |
| 6,782,948 B2 | 8/2004 | Echols et al. | |
| 2002/0096328 A1* | 7/2002 | Echols | E21B 43/045 166/278 |
| 2010/0163235 A1 | 7/2010 | Mootoo et al. | |
| 2011/0297396 A1* | 12/2011 | Hendel | E21B 21/10 166/85.4 |
| 2015/0083952 A1* | 3/2015 | Bormioli | F16K 1/165 251/212 |
| 2019/0145220 A1 | 5/2019 | Patel et al. | |
| 2021/0054714 A1* | 2/2021 | Nichols | E21B 34/063 |
| 2021/0054719 A1* | 2/2021 | Nichols | E21B 34/12 |
| 2021/0189826 A1* | 6/2021 | Gallagher | G05D 16/202 |

OTHER PUBLICATIONS

B. Thomson el at., Maximizing Completion Efficiency Using Remotely Operated Barrier Valves, SPE-183210-MS, pp. 1-10 (10 pages).
A. Cooper, "Remotely Operated Valve Eliminates Intervention in Well Barrier Placement", JPT, Dec. 2013, pp. 30-32 (3 pages).
"How Does an Ieis Valve Works?" Vortex (vortexglobal.com), Feb. 16, 2016 (5 pages).

* cited by examiner

FULL-BORE IRIS ISOLATION VALVE

BACKGROUND

In the field of oil and gas, artificial lift systems are used in well production. Artificial lift is a process used on oil wells to increase pressure within the reservoir and encourage oil to the surface. Artificial lift systems include but are not limited to electrical submersible pumps (ESP), progressing cavity pumps, beam pumping, and gas lift systems. Completion equipment deployment in wells that require the use of smart completion and ESP set at high inclination need the isolation of the tubing in order to apply pressure to set the packer. Conventional procedures require the use of a plug to be run in the hole using coiled tubing equipment. Once the ESP packer is set, the plug has to be retrieved. This procedure requires high costs and long periods of time due to the use of coiled tubing equipment.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a system for a packer in a well, the system comprising: a completion string, having production tubing, disposed within the well, wherein the packer is connected to the production tubing and the production tubing defines an annulus in the well; a full-bore iris isolation valve installed on the production tubing and located downhole from the packer, wherein the full-bore iris isolation valve comprises an open position, a closed position, and a plurality of blades, the closed position isolating the annulus from an inner orifice of the production tubing to set the packer in the well; an activation mechanism disposed adjacent to and up hole from the full-bore iris isolation valve and configured to interact with the plurality of blades to place the full-bore iris isolation valve in the open position and the closed position; a sliding sleeve, having an inner profile, connected to and located up hole from the activation mechanism; and a setting tool having an external circumferential surface that mates with the inner profile of the sliding sleeve to apply a push force and a pull force to the sliding sleeve, wherein the push force is applied to the full-bore iris isolation, using the activation mechanism, to place the full-bore iris isolation valve in the closed position and the pull force is applied to the full-bore iris isolation, using the activation mechanism, to place the full-bore iris isolation valve in the open position.

In one aspect, embodiments disclosed herein relate to a method for setting a packer in a well, the method comprising: running a completion string to a predetermined depth in the well, the completion string comprising a full-bore iris isolation valve, a sliding sleeve, an activation mechanism, and the packer, wherein the packer is located up hole from the full-bore iris isolation valve on the completion string; running a setting tool into an orifice of the completion string; engaging an external circumferential surface of the setting tool with an inner profile of the sliding sleeve; applying a pushing force to the full-bore iris isolation valve from the setting tool through the sliding sleeve and the activation mechanism to place the full-bore iris isolation valve in a closed position; applying a setting pressure on the full-bore iris isolation valve, in the closed position, to set the packer in the well; and applying a pulling force to the full-bore iris isolation valve from the setting tool through the sliding sleeve and the activation mechanism to place the full-bore iris isolation valve in an open position.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1:
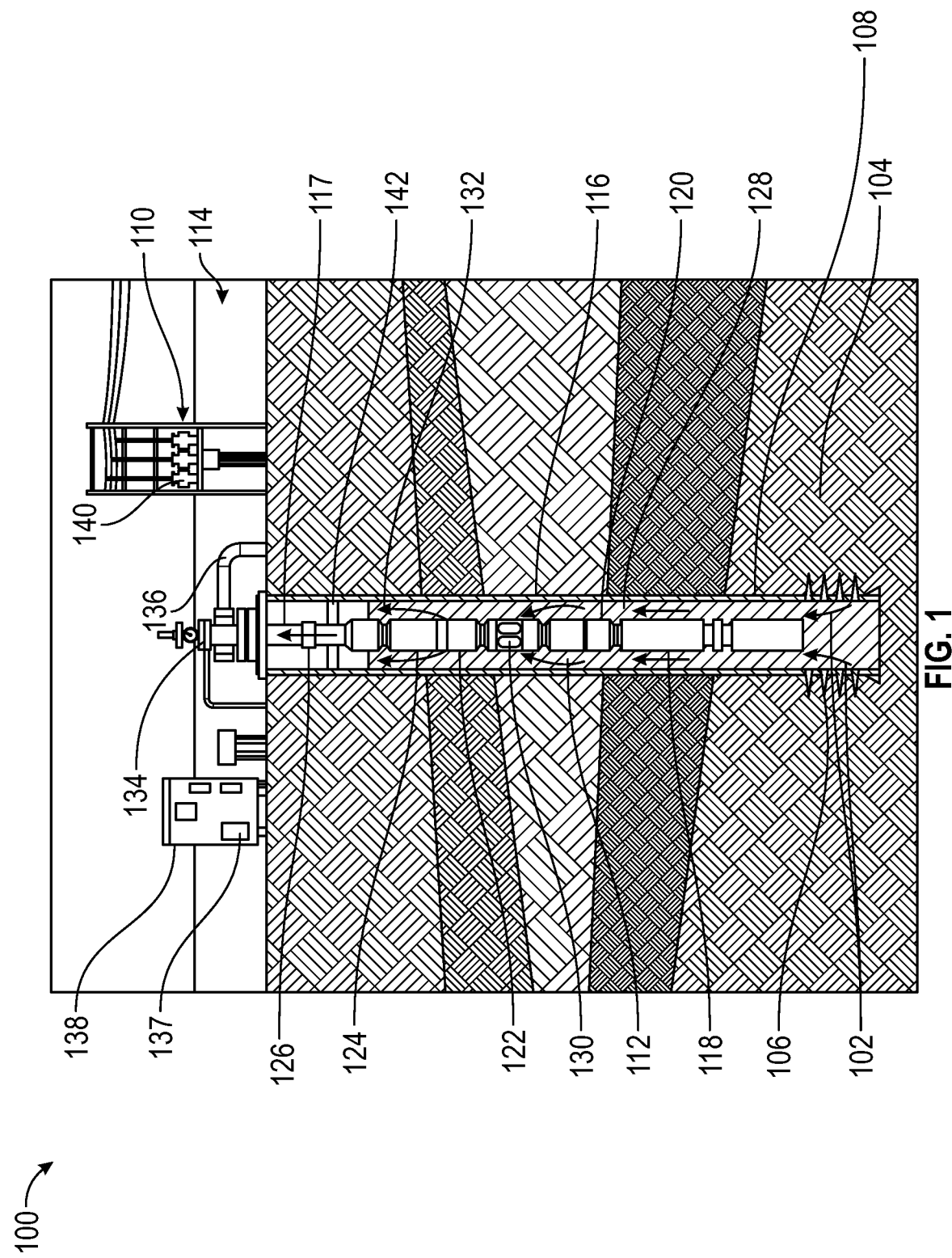
FIG. 1 shows an exemplary well with an Electrical Submersible Pump (ESP) completion design in accordance with one or more embodiments.

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

FIG. 1 shows an exemplary ESP system (100) in accordance with one or more embodiments. The ESP system (100) is used to help produce produced fluids (102) from a formation (104). Perforations (106) in the well casing (108) provide a conduit for the produced fluids (102) to enter the well (116) from the formation (104). The well (116) may be of vertical orientation or deviated at an angle. A deviated well (116) is well known in the art. The ESP system (100) includes a surface portion having surface equipment (110) and a downhole portion having an ESP string (112).

The ESP string (112) is deployed in a well (116) on production tubing (117) and the surface equipment (110) is located on a surface location (114). The surface location (114) is any location outside of the well (116), such as the Earth's surface. The production tubing (117) extends to the surface location (114) and is made of a plurality of tubulars connected together to provide a conduit for produced fluids (102) to migrate to the surface location (114).

The ESP string (112) may include a motor (118), motor protectors (120), a gas separator (122), a multi-stage centrifugal pump (124) (herein called a "pump" (124)), and a power cable (126). The ESP string (112) may also include various pipe segments of different lengths to connect the components of the ESP string (112). The motor (118) is a downhole submersible motor (118) that provides power to the pump (124). The motor (118) may be a two-pole, three-phase, squirrel-cage induction electric motor (118). The motor's (118) operating voltages, currents, and horsepower ratings may change depending on the requirements of the operation.

The size of the motor (118) is dictated by the amount of power that the pump (124) requires to lift an estimated volume of produced fluids (102) from the bottom of the well (116) to the surface location (114). The motor (118) is cooled by the produced fluids (102) passing over the motor (118) housing. The motor (118) is powered by the power cable (126). The power cable (126) is an electrically conductive cable that is capable of transferring information. The power cable (126) transfers energy from the surface equipment (110) to the motor (118). The power cable (126) may be a three-phase electric cable that is specially designed for downhole environments. The power cable (126) may be clamped to the ESP string (112) in order to limit power cable (126) movement in the well (116).

Motor protectors (120) are located above (i.e., closer to the surface location (114)) the motor (118) in the ESP string (112). The motor protectors (120) are a seal section that houses a thrust bearing. The thrust bearing accommodates axial thrust from the pump (124) such that the motor (118) is protected from axial thrust. The seals isolate the motor (118) from produced fluids (102). The seals further equalize the pressure in the annulus (128) with the pressure in the motor (118). The annulus (128) is the space in the well (116) between the casing (108) and the ESP string (112). The pump intake (130) is the section of the ESP string (112) where the produced fluids (102) enter the ESP string (112) from the annulus (128).

The pump intake (130) is located above the motor protectors (120) and below the pump (124). The depth of the pump intake (130) is designed based off of the formation (104) pressure, estimated height of produced fluids (102) in the annulus (128), and optimization of pump (124) performance. If the produced fluids (102) have associated gas, then a gas separator (122) may be installed in the ESP string (112) above the pump intake (130) but below the pump (124). The gas separator (122) removes the gas from the produced fluids (102) and injects the gas (depicted as separated gas (132) in FIG. 1) into the annulus (128). If the volume of gas exceeds a designated limit, a gas handling device may be installed below the gas separator (122) and above the pump intake (130).

The pump (124) is located above the gas separator (122) and lifts the produced fluids (102) to the surface location (114). The pump (124) has a plurality of stages that are stacked upon one another. Each stage contains a rotating impeller and stationary diffuser. As the produced fluids (102) enter each stage, the produced fluids (102) pass through the rotating impeller to be centrifuged radially outward gaining energy in the form of velocity.

The produced fluids (102) enter the diffuser, and the velocity is converted into pressure. As the produced fluids (102) pass through each stage, the pressure continually increases until the produced fluids (102) obtain the designated discharge pressure and has sufficient energy to flow to the surface location (114). The ESP string (112) outlined in FIG. 1 may be described as a standard ESP string (112), however, the term ESP string (112) may be referring to a standard ESP string (112) or an inverted ESP string (112) without departing from the scope of the disclosure herein.

A packer (142) is disposed around the ESP string (112). Specifically, the packer (142) is located above (i.e., closer to the surface location (114)) the multi-stage centrifugal pump (124). The packer (142) may be any packer (142) known in the art such as a mechanical packer (142). The packer (142) seals the annulus (128) space located between the ESP string (112) and the casing (108). This prevents the produced fluids (102) from migrating past the packer (142) in the annulus (128).

In one or more embodiments, sensors may be installed in various locations along the ESP string (112) to gather downhole data such as pump intake volumes, discharge pressures, and temperatures. The number of stages is determined prior to installation based of the estimated required discharge pressure. Over time, the formation (104) pressure may decrease and the height of the produced fluids (102) in the annulus (128) may decrease. In these cases, the ESP string (112) may be removed and resized. Once the produced fluids (102) reach the surface location (114), the produced fluids (102) flow through the wellhead (134) into production equipment (136). The production equipment (136) may be any equipment that can gather or transport the produced fluids (102) such as a pipeline or a tank.

The remainder of the ESP system (100) includes various surface equipment (110) such as electric drives (137) and pump control equipment (138) as well as an electric power supply (140). The electric power supply (140) provides energy to the motor (118) through the power cable (126). The electric power supply (140) may be a commercial power distribution system or a portable power source such as a generator.

The pump control equipment (138) is made up of an assortment of intelligent unit-programmable controllers and drives which maintain the proper flow of electricity to the motor (118) such as fixed-frequency switchboards, soft-start controllers, and variable speed controllers. The electric drives (137) may be variable speed drives which read the downhole data, recorded by the sensors, and may scale back or ramp up the motor (118) speed to optimize the pump (124) efficiency and production rate. The electric drives (137) allow the pump (124) to operate continuously and intermittently or be shut-off in the event of an operational problem.

In ESP systems (100), conventional procedures require the use of a plug to be run in the hole to set a packer (142).

The plug inside of the production tubing (117) may be used to create a barrier to allow the application of differential pressure required to set the packer (142). Once the packer (142) is set, the plug must be retrieved resulting in high costs and long times. An example used for the retrieval of a packer (142) is slickline. Well known in the industry, slickline may refer to a single strand wire used for selective placement and retrieval of wellbore hardware. The hardware includes but is not limited to plugs, gauges, and valves. Many ESP systems (100) require packers (142) to be set at an inclination. A packer (142) set in high inclination wells requires the isolation of tubing (117) internally. Isolation of production tubing (117) may refer to the prevention of formation fluids entering into the production tubing (117). Slickline is normally limited to a 45-degree inclination. At higher inclination, slickline is limited and may require the use of additional devices attached to the slickline such as tractors to which have been known to fail.

The alternative option for the retrieval of a packer (142) in high inclination wells requires the use of coiled tubing equipment resulting in high costs and long times. Therefore, systems and methods that allow packers (142) to be set at an inclination and without the use of coiled tubing equipment and isolation plugs are beneficial. As such, embodiments disclosed herein present a full-bore iris isolation valve (200) that is mechanically activated installed in the ESP string (112) that will allow the isolation of the production tubing (117) internally in order to set the packers (142) at high inclination or at any inclination necessary. One skilled in the art would appreciate this method works in vertical wells (116) and deviated wells (116).

This method may be used for future well interventions such as workovers in cases requiring the isolation of the production tubing (117). For example, well control situations including kicks or blowouts may be prevented by isolation of production tubing (117) to prevent formation fluids from entering into the ESP string (112) and migrating to the surface (114).

Figure 2:
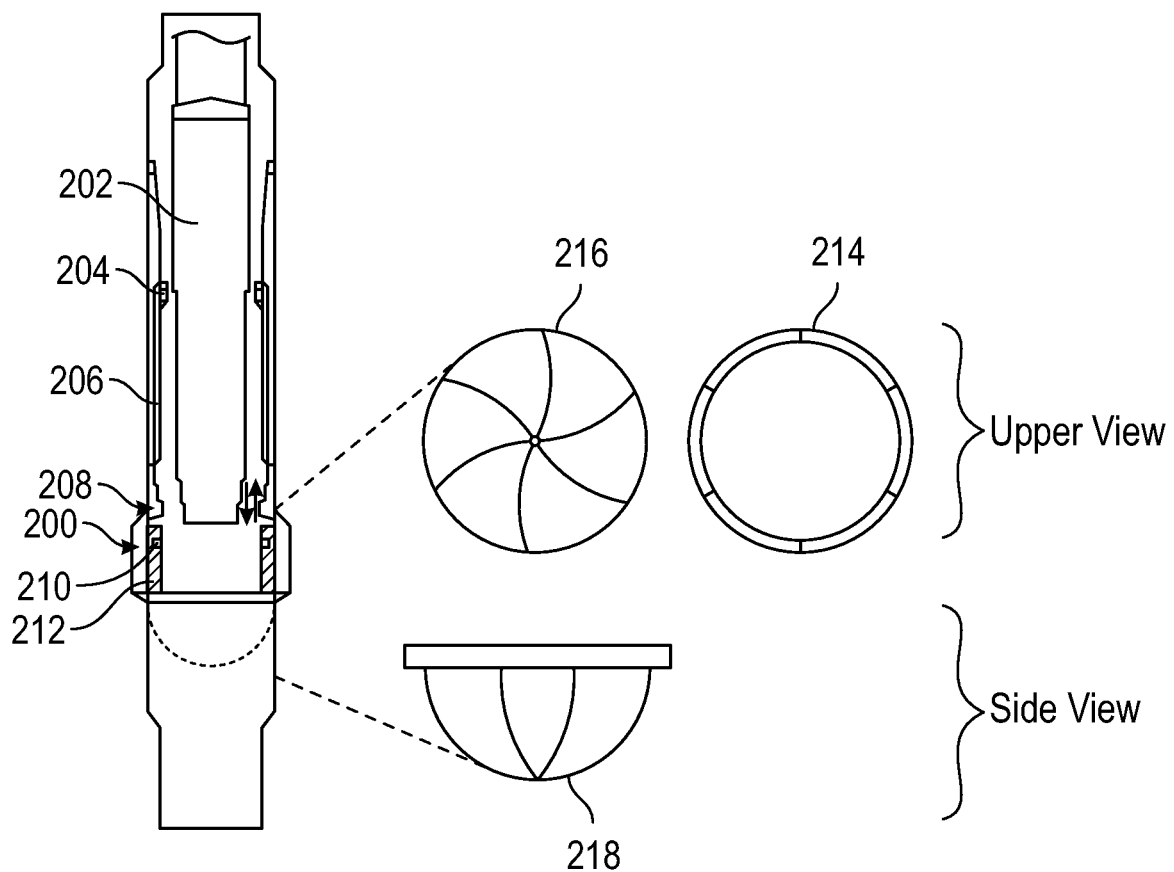
FIG. 2 shows a cross section of a full-bore iris isolation valve schematic in accordance with one or more embodiments.

FIG. 2 shows a cross section of a full-bore iris isolation valve (200) in accordance with one or more embodiments. The full-bore iris isolation valve (200) may be made from any durable material known in the art, such as a composite material able to withstand pressurized and corrosive environments. The full-bore isolation iris valve (200) material may be drillable. The drillable material allows for continual operations rather than the need to retrieve the equipment before continuing. Although operations can continue without the retrieval of the full-bore iris isolation valve (200), the full-bore iris isolation valve (200) may be retrieved, if necessary, by retrieving the completion string (e.g., ESP string 112). The full-bore iris isolation valve (200) may contain a full-bore diameter maintaining the same tubing inner diameter without a restriction in the completion string (e.g., ESP string 112). The full-bore iris isolation valve (200) is located on the production tubing (117). A setting tool (202) may be run in with the production tubing (117). The production tubing (117) embodies the full-bore iris isolation valve (200), a latch mechanism (204), a sliding sleeve (206), an activation mechanism (208), and a latching groove (210).

The setting tool (202) may be run in hole with the production tubing (117) or ESP string (112). The setting tool (202) is a device or tool that may be used in the placement or setting of downhole equipment such as packers (142) or plugs. The setting tool (202) may have the ability to set bridge plugs, straddles, gauge hangers, cement retainers, and more. The setting tool (202) may be retrieved. The setting tool (202) may be hydraulic, electronic, or mechanical. The setting tool (202) may have an external circumferential surface that mates with the inner profile of the sliding sleeve (206). The latch mechanism (204) may have a shape that allows the setting tool to clasp.

The sliding sleeve (206) may be any tool that can direct flow from the casing (108) to the production tubing (117). The sliding sleeve (206) may be inside and may be activated mechanically through the setting tool (202) that may latch in a profile inside the production tubing (117). The profile inside the production tubing (117) may be a section of the production tubing (117) with any shape allowing the setting tool (202) to attach. The sliding sleeve (206) is disposed uphole from the activation mechanism (208) and the latching groove (210). The activation mechanism (208) may be disposed adjacent to the full-bore iris isolation valve (200). The activation mechanism (208) may be configured to push and pull. The full-bore iris isolation valve (200) embodies valve blades (212) that can be open and closed. The activation mechanism (208) may be used to push the valve blades (212) and pull the valve blades (212) for the purpose of opening and closing the full-bore iris isolation valve (200). Application of slack off weight may be used to push the sliding sleeve (206) and activate the valve blades (212) to a closed position to place the full-bore iris isolation valve (200) in the closed position isolating the completion string (e.g., ESP string 112) internally. The isolation of the completion string (e.g., ESP string 112) isolates the annulus (128) from an inner orifice of the production tubing (117). The isolation of the production tubing (117) allows for application of pressure to set the packer (142). Pressure may be added organically from the formation fluids or the pores of the formation (104). The application of pressure may be applied by injection or pressure dependent on the packer provider. The isolation of the completion string (e.g., ESP string 112) may replace the conventional use of the isolation from plugs and coiled tubing operations. The completion string (e.g., ESP string 112) may be attached to the packer (142) by latching. Engagement of the setting tool (202) to the latching groove (210) may create a pull force to open the valve blades (212).

Specifically, FIG. 2 shows an upper view of the valve blades fully open (214) and fully closed (216) and a side view of the valve blades fully closed (218). The valve blades (212) fully closed may be considered fully closed if valve blades (212) are connected with no space in between. The valve blades (212) fully open may be open in any amount of space between the valve blades (212) to be considered fully open. Fully open (214) valve blades (212) place the full-bore iris isolation valve (200) in an open position. The valve blades (212) may be one or more objects having the ability to join together and separate apart. The valve blades (212) may be of any shape necessary to fit on the full-bore iris isolation valve (200). Each valve blade may or may not be identical. The valve blades (212) may form a tip in the fully closed (216) position. Each tip of the valve blades (212) may approach a singular point to form a half-sphere shape. The valve blades (212) may be made of any material that can withstand the temperatures and movement required. The valve blades (212) may incorporate interlocking parts that allow the valve blades (212) to come together and remain together.

In one or more disclosure, the setting tool (202) latches into the latch mechanism (204). The application of slack off weight in the completion string (e.g., ESP string (112) may activate the sliding sleeve (206). The sliding sleeve (206) is displaced downwards to the latching groove (210) where the activation mechanism (208) applies a push force to the valve blades (212) to a be fully closed (216) by continual application of slack off weight. The setting tool (202) may then move upwards releasing the slack off weight. As the setting tool (202) moves upward, the setting tool (202) will unlatch from the latching groove (210). The setting tool (202) may be pulled from the hole leaving the production tubing (117) in isolation. After setting the packer (142), pressure is applied in the annulus (128) to confirm the setting with no leakage.

In another embodiment, the setting tool (202) may latch to the latch mechanism (204). The setting tool (202) may rotate counterclockwise. The rotation may be between ½ turns and ¾ turns allowing the sliding sleeve (206) to return to the original position. The forces applied in the activation mechanism (208) of closing the valve are released. The sliding sleeve (206) released from the latching groove (210) allow the valve blades (212) to return to the fully open (214) position. The setting tool (202) may then be turned clockwise greater than ¾ of a turn to set the setting tool (202) free. The setting tool (202) may then be moved upwards and pulled out of the hole.

Figure 3:
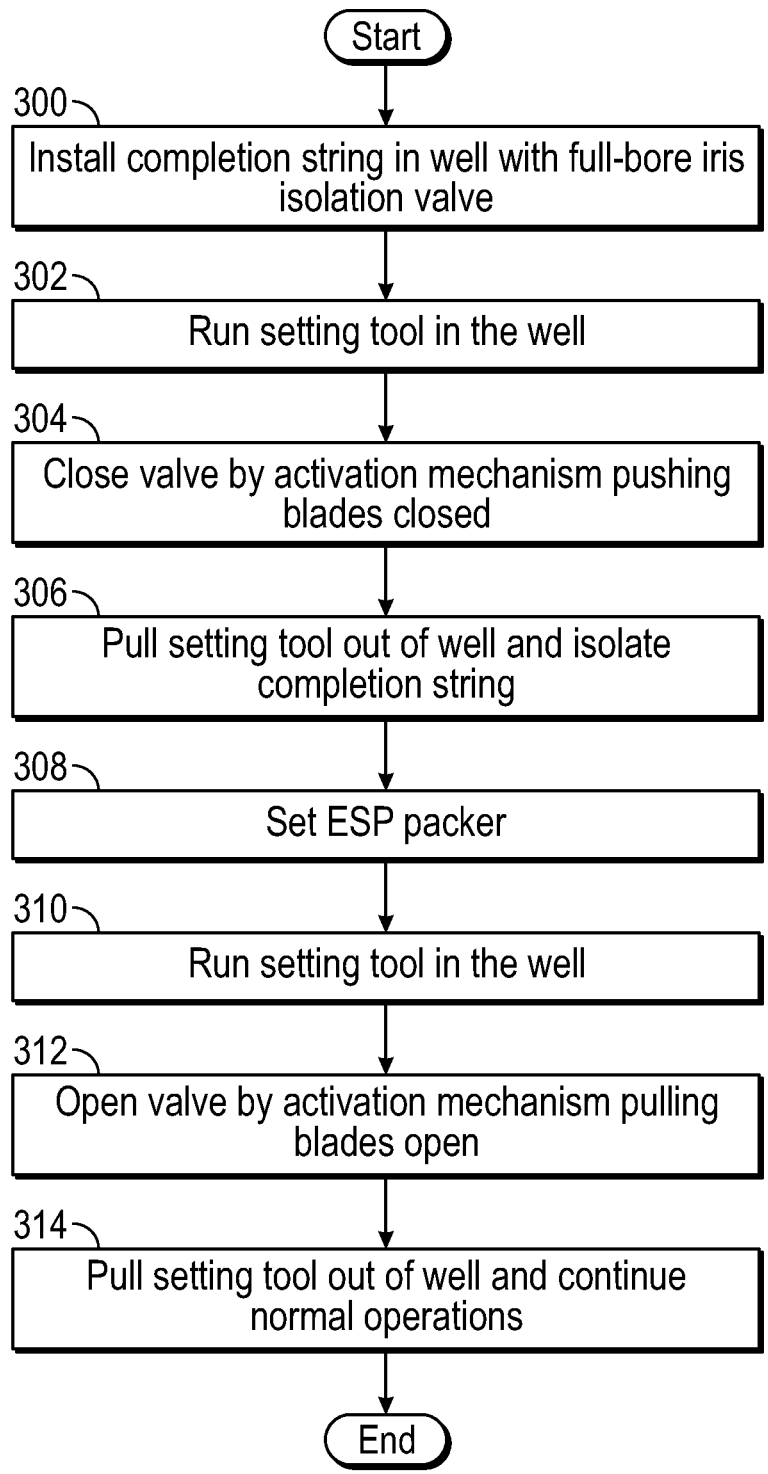
FIG. 3 shows a flow chart in accordance with one or more embodiments.

FIG. 3 shows a flow chart in accordance with one or more embodiments. Specifically, the flowchart illustrates a method for allowing continued operations while setting a packer (142). Further, one or more blocks in FIG. 3 may be performed by one or more components as described in FIGS. 1-2. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Initially, a completion string (e.g., 112) is installed in the well (116) at a predetermined depth with the full-bore iris isolation valve (Block 300). The well (116) may be vertical as shown in FIG. 1, or the well (116) may be at an inclination. In both the vertical well (116) and the inclined well (116), the completion string (e.g., 112) further includes an activation mechanism (208), a sliding sleeve (206), a latch mechanism (204), and a latching groove (210). A setting tool (202) is run in the well (116) with the completion string (e.g., 112) (Block 302). The setting tool (202) may be run into an orifice of the completion string (e.g., 112). The full-bore iris isolation valve (200) is disposed within the completion string (e.g., 112).

The full-bore iris isolation valve (200) further includes valve blades (212). The valve blades (212) are made of individual parts with the ability to be fully open (214) and fully closed (216). In this disclosure, the full-bore iris isolation valve (200) is closed by the activation mechanism (208) that pushes the valve blades (212) closed (Block 304). The activation mechanism (208) interacts with the valve blades (212) to place the full-bore iris isolation valve (200) in a closed position. After the full-bore iris isolation valve (200) is closed, the setting tool (202) is pulled out of the well (116) and the completion string (e.g., 112) is isolated (Block 306). The ESP packer (142) is then set (Block 308). Pressure may be applied to the annulus (128) to confirm setting. After the ESP packer (142) is set, the setting tool (310) is run into the well (116) (Block 310). The activation mechanism (208) then opens the full-bore isolation valve by pulling the valve blades (212) open (Block 312). Finally, the setting tool (202) is pulled out of the well (116) and normal operations continue (Block 314). Normal operations may include continual production.

Embodiments disclosed above allow for setting packers at high inclination without the use of coiled tubing equipment and isolation plugs. One or more embodiments involve a full-bore iris isolation valve that can isolate production tubing (117) and apply pressure to set packers in order to minimize operational cost impact and time so as to maximize return on investment. Embodiments disclosed above describe specific examples of a completion string (e.g., 112) make up using specific components in a specific order. However, any completion string (e.g., 112) with the full-bore isolation valve (200) may be used without departing from the scope of the disclosure herein.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A system for a packer in a well, the system comprising:
   a completion string, having production tubing, disposed within the well, wherein the packer is connected to the production tubing and the production tubing defines an annulus in the well;
   a full-bore iris isolation valve installed on the production tubing and located downhole from the packer, wherein the full-bore iris isolation valve comprises an open position, a closed position, and a plurality of blades, the closed position isolating the annulus from an inner orifice of the production tubing to set the packer in the well;
   an activation mechanism disposed adjacent to and up hole from the full-bore iris isolation valve and configured to interact with the plurality of blades to place the full-bore iris isolation valve in the open position and the closed position;
   a sliding sleeve, having an inner profile, connected to and located up hole from the activation mechanism; and
   a setting tool having an external circumferential surface configured to mate with the inner profile of the sliding sleeve such that the setting tool is configured to apply a push force and a pull force to the sliding sleeve, wherein when the push force is applied to the full-bore iris isolation, using the activation mechanism, the full-bore iris isolation valve is placed in the closed position and when the pull force is applied to the full-bore iris isolation valve, using the activation mechanism, the full-bore iris isolation valve is placed in the open position.

2. The system of claim 1, wherein the full-bore iris isolation valve is made of a drillable material.

3. The system of claim 1, wherein each of the plurality of blades comprise a tip and, when the full-bore iris isolation valve is in the closed position, each tip approaches a singular point to form a half-sphere shape.

4. The system of claim 1, further comprising a latching groove disposed on the full-bore iris isolation valve, wherein the latching groove is configured to engages with the setting tool to enable applying the pull force to the sliding sleeve.

5. The system of claim 1, wherein the sliding sleeve further comprises a latch mechanism disposed around the inner profile.

6. The system of claim 5, wherein the latch mechanism is configured to engaged with the setting tool to enable applying the push force to the sliding sleeve.

7. The system of claim 1, wherein the sliding sleeve comprises a downhole position and an up hole position.

8. The system of claim 7, wherein the sliding sleeve is configured to be placed in the downhole position using the push force applied by the setting tool.

9. The system of claim 8, wherein the sliding sleeve is configured to be placed in the up hole position using the pull force applied by the setting tool.

10. A method for setting a packer in a well, the method comprising:
   running a completion string to a predetermined depth in the well, the completion string comprising a full-bore iris isolation valve, a sliding sleeve, an activation mechanism, and the packer, wherein the packer is located up hole from the full-bore iris isolation valve on the completion string;
   running a setting tool into an orifice of the completion string;
   engaging an external circumferential surface of the setting tool with an inner profile of the sliding sleeve; applying a pushing force to the full-bore iris isolation valve from the setting tool through the sliding sleeve and the activation mechanism to place the full-bore iris isolation valve in a closed position;
   applying a setting pressure on the full-bore iris isolation valve, in the closed position, to set the packer in the well; and
   applying a pulling force to the full-bore iris isolation valve from the setting tool through the sliding sleeve and the activation mechanism to place the full-bore iris isolation valve in an open position.

11. The method of claim 10, wherein engaging the external circumferential surface of the setting tool to the inner profile of the sliding sleeve further comprises engaging a latch mechanism, disposed on the inner profile, with the external circumferential surface of the setting tool.

12. The method of claim 11, wherein the full-bore iris isolation valve comprises a plurality of blades each having a tip and placing the full-bore iris isolation valve in the closed position further comprises connecting each tip to a singular point.

13. The method of claim 12, wherein placing the full-bore iris isolation valve in the closed position comprises a pushing force by the activation mechanism to the plurality of blades located on the full-bore iris isolation valve.

14. The method of claim 12, wherein placing the full-bore iris isolation valve in the open position comprises engaging the sliding sleeve to the latch mechanism up hole from the activation mechanism and pulling the plurality of blades open.

15. The method of claim 14, wherein pulling the plurality of blades open sets the full-bore iris isolation valve to the open position to provide a full-bore opening.

16. The method of claim 10, wherein applying a pulling force to the full-bore isolation valve from the setting tool further comprises engaging the external circumferential surface of the setting tool to a latching groove located on the full-bore iris isolation valve.

17. The method of claim 16, further comprises engaging the sliding sleeve to the latching groove to place the full-bore iris isolation valve in the closed position.

18. The method of claim 17, wherein engaging the sliding sleeve is controlled by weight application through pressure.

* * * * *